United States Patent [19]
Van Sickle

[11] Patent Number: 4,885,492
[45] Date of Patent: Dec. 5, 1989

[54] ROTARY POWER MODULE CONSTRUCTION

[75] Inventor: Robert J. Van Sickle, Richmond, Va.

[73] Assignee: United Power Corporation, Richmond, Va.

[21] Appl. No.: 284,358

[22] Filed: Dec. 14, 1988

[51] Int. Cl.$^4$ .......................... H02K 7/18; H02K 7/02; H02K 5/00

[52] U.S. Cl. .................................... 310/113; 310/91; 310/157; 310/74; 310/102 R

[58] Field of Search ................. 310/113, 112, 91, 157, 310/74, 102 R

[56] References Cited

U.S. PATENT DOCUMENTS

| | | | |
|---|---|---|---|
| 2,454,955 | 6/1947 | Wieseman | 310/157 |
| 2,702,869 | 2/1955 | Felici | 310/157 |
| 3,609,426 | 9/1971 | Gavl | 310/74 |
| 4,168,459 | 9/1979 | Roesel | 310/112 |

Primary Examiner—Patrick R. Salce
Assistant Examiner—Clayton E. LaBalle
Attorney, Agent, or Firm—Richard P. Matthews

[57] ABSTRACT

A rotary power module construction especially useful in computer room application. A motor-generator set consisting of an induction motor and synchronous generator is mounted vertically and a direct drive is provided between the components by an electrically insulating coupling. A flywheel is mounted on a shaft of the synchronous generator to provide a maximum ride through condition for short term power outages. A plurality of spider-like leg members envelop the flywheel providing retainment protection for the flywheel as well as providing a suitable support for the synchronous generator. The spider-like leg members are anchored to a plate member which is secured to a non-rotating part of the induction motor. The motor-generator set is encased within a housing that is serviced only from the front of the housing, thereby occupying a minimum amount of space in the computer room. A microprocessor controlled bypass is available to ensure the supply of commerical power to the computer room in the event of an overload or abnormal condition in the motor-generator set.

2 Claims, 3 Drawing Sheets

ROTARY POWER MODULE CONSTRUCTION

This invention relates to a rotary power module construction employing a vertically mounted induction motor-synchronous generator set and, more particularly, to such a construction which substantially reduces or eliminates computer downtime.

BACKGROUND OF THE INVENTION

Heretofore, many studies have been made assessing the quality of electrical power available commercially and its effect on driving modern, sophisticated, high speed computer systems. One of the most comprehensive and impartial studies is that of an IEEE published Bell Telephone Laboratories study entitled, "The Quality of U.S. Commercial AC Power". The presentation of this study was made in Washington, D.C. during a Telecommunications and Energy conference held October 3-6, 1986. The presentation was made by Dr. Marvin Goldstein and Mr. Paul Speranza.

In this report, the authors gathered data from 24 A T & T Long Line, Western Electric and Bell Operating company sites in twelve different states. The data spanned 270 total months of power monitoring for the purpose of reducing or eliminating computer downtime for the Bell System through the selection of appropriate, cost-effective, power conditioning equipment. The following power problems, listed as a percent of total number of events, were the findings of this study:

Sags—87%
Impulses (Noise) 7.4%
Power failures 4.7%
Surges 0.7%

Further data from the aforementioned report with respect to the duration of power sags is illustrated in the following table:

BELL SYSTEM AC LINE DISTURBANCE DATA-POWER FAILURE AND SAG LASTING TIMES

| BELL SYSTEM AC LINE DISTURBANCE DATA-POWER FAILURE AND SAG LASTING TIMES | |
|---|---|
| Percentage Lasting Less Than Time Indicated | Time |
| Sags | |
| 10% | 0.03 Secs |
| 25% | 0.09 Secs |
| 50% | 0.12 Secs |
| *75% | 0.24 Secs |
| 90% | 0.53 Secs |
| Power Failure | |
| 10% | 0.6 Secs |
| 25% | 1.1 Secs |
| 50% | 38.0 Secs |
| 75% | 40 Mins |
| 90% | 4.2 Hrs |

*Of all the sags in the Bell System, 75% will last less than 0.24 seconds.

SUMMARY OF THE PRESENT INVENTION

In accordance with the present invention, a motor-generator set is vertically mounted for installations up to about 125 KVA thereby occupying substantially less computer floor area than horizontally mounted motor-generator sets. The motor-generator set is also completely serviced from the front of the housing which also uses less space than conventionally mounted motor-generator sets.

The motor itself is an induction motor which receives the raw utility, non-computer grade power and it is directly coupled to the shaft of a synchronous generator by means of an electrically insulating coupling. The generator generates new computer grade power for use by the computers in the computer room. This process provides total isolation of the load from the utility line, thereby eliminating all impulses and common mode noise.

In the preferred embodiment, a flywheel is also mounted on the shaft of the synchronous generator between the coupler and the generator and protected and retained by a unique spider-leg enveloping means. This spider-leg enveloping means also provides a vertical support for the synchronous generator. This construction provides for the generation of a computer grade power and protects the load from virtually all voltage fluctuations, i.e., sags and surges, while its mechanical energy and momentum provides momentary power failure or blackout protection against conditions such as light flickers or even utility reclosure switching events.

The aforementioned system may optionally include a microprocessor controlled bypass to continue to supply the raw utility or commercial power to the computer room in the event of an overload or abnormal condition in the motor-generator set which is detected by the microprocessor.

The inherent advantages and improvements of the present invention will become more readily apparent upon reference to the following detailed description of the invention and by reference to the drawings wherein.

DETAILED DESCRIPTION OF THE PREFERRED EMBODIMENT

Figure 1:
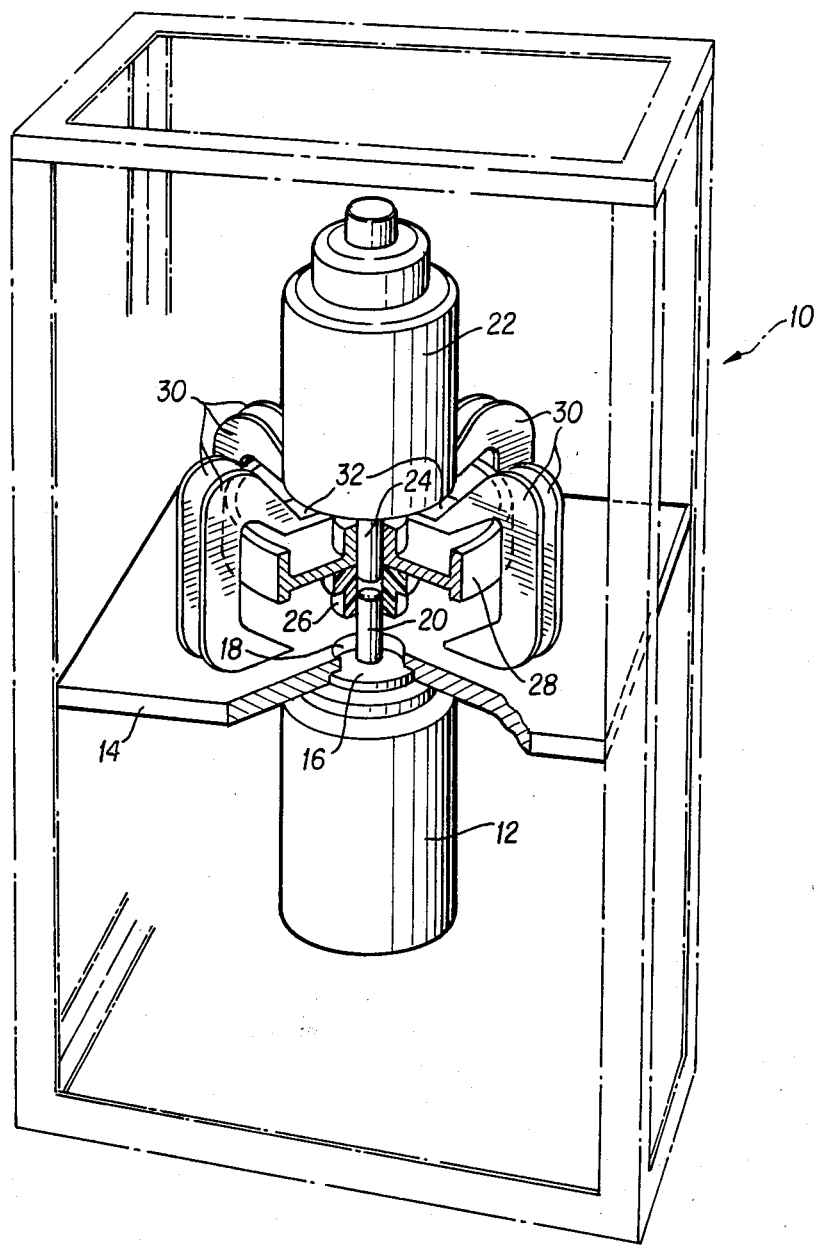
FIG. 1 is a perspective view of the motor-generator set of the present invention with portions broken away and shown in vertical cross section.

Referring now to FIG. 1 of the drawings, a housing is generally designated at 10 for a rotary power module which is especially useful in computer room applications. A motor 12 resting on the floor of the housing is mounted vertically with the motor being preferably an asynchronous induction motor. The motor is preferably oversized to provide longer life for the system. Plate member 14 is suitably secured to a non-rotating portion of induction motor 12 such as its flange 16. A central aperture 18 in plate member 14 permits a vertical output shaft 20 to extend therethrough.

Synchronous generator 22 is also mounted vertically and has its depending shaft 24 in line with shaft 20 of motor 12 whereby a direct coupling can be made by electrically insulating coupler member 26. Flywheel 28 is mounted on the depending vertical shaft 24 of the synchronous generator in order to provide increased momentum for the system and to obtain maximum ride through in the event of power failure or outages.

Figure 2:
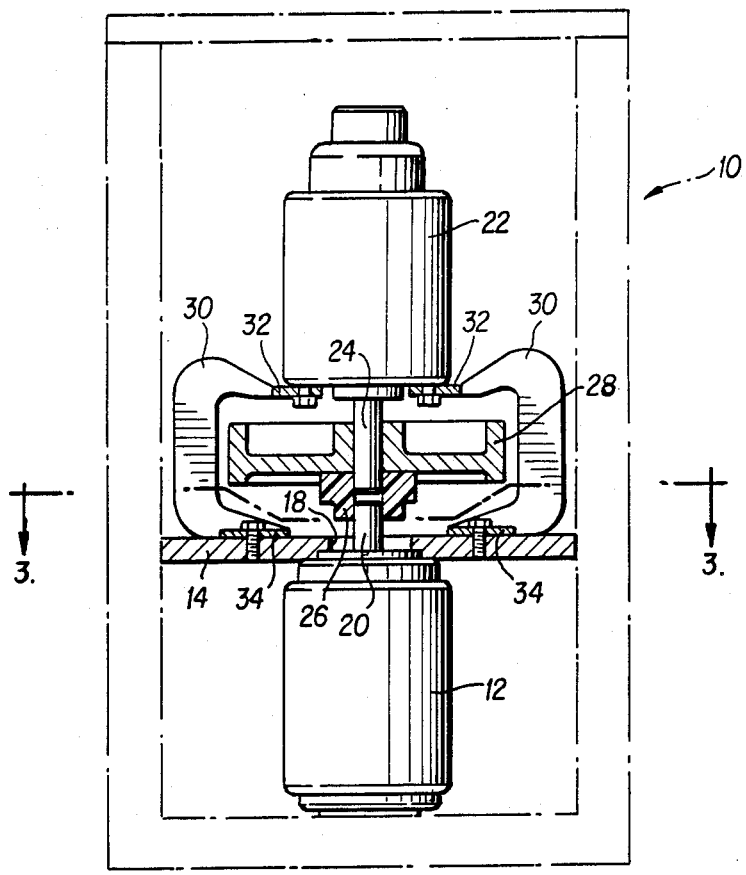
FIG. 2 is a front elevational view of the motor-generator set of FIG. 1 with portions shown in vertical cross-section.
Figure 3:
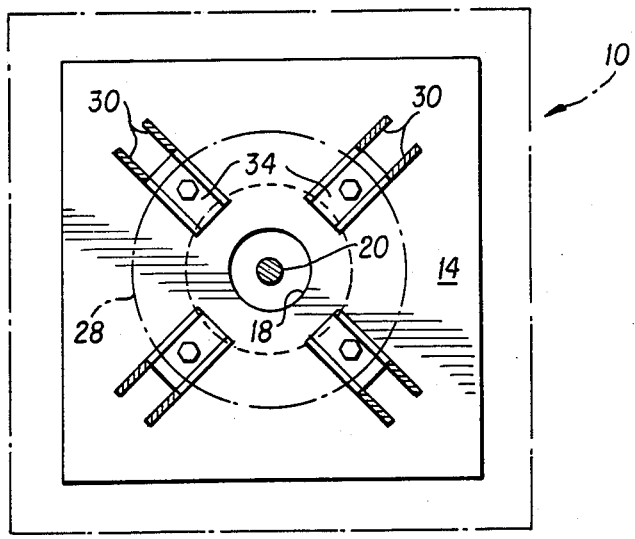
FIG. 3 is a plan view taken in horizontal cross-section along line 3—3 of FIG. 2 with parts removed.

Spider-like legs 30 constitute enveloping means or restraining means for the flywheel 28 and, as best illustrated in FIG. 2, these spider-like legs are provided with upper horizontal flanges 32 for securement to the synchronous generator 22 by means of bolts or the like. Similarly, the spider-like legs 30 are provided with lower horizontal flanges 34 as seen in both FIGS. 2 and 3 for securement as by bolts to plate member 14. The spider-like legs 30 of which eight are illustrated, extend in pairs between the upper horizontal flanges 32 and lower horizontal flanges 34 as is shown in both FIGS. 1 and 3.

Figure 4:
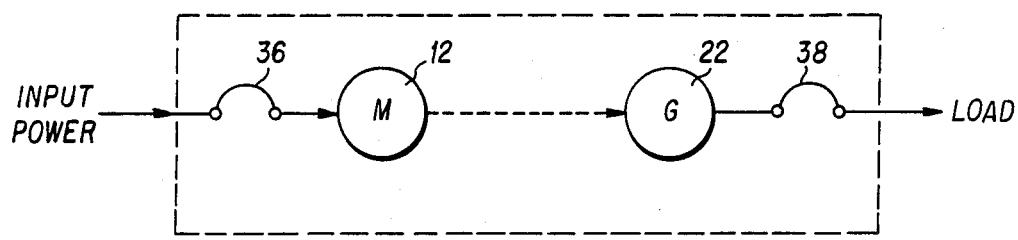
FIG. 4 is a schematic diagram showing normal operation of a motor-generator set.

Reference to FIG. 4 illustrates that commercially available power or utility input power is supplied to motor 12 protected by an input circuit breaker 36 and the regenerated computer grade power is delivered to the load from generator 22 with an output circuit breaker 38 inserted therebetween.

Figure 5:
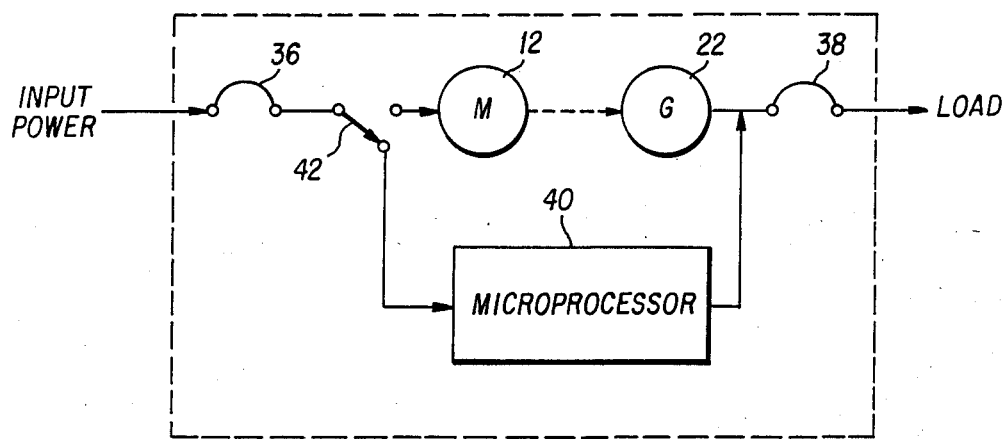
FIG. 5 is a schematic diagram showing a by-pass condition.

FIG. 5 shows an optional feature wherein the rotary power module is equipped with a microprocessor 40 to provide an uninterrupted bypass circuit. Switch 42 may be placed manually in the position shown in FIG. 5 so as to bypass the motor 12 and generator 22 enabling the critical load to remain up and operating during any system fault condition and preventive maintenance. This bypass circuit provides the user with two different modes of uninterrupted, synchronized operations. First, the user may manually elect to bypass utility power around the motor generator system. Secondly, the circuit is programmed to search continuously for an abnormal condition within the system itself. Upon an overload or abnormal condition, the system automatically initiates its synchronized, uninterrupted bypass capability to keep the load up, thus avoiding disastrous computer downtime.

Some of the operating characteristics of the present invention include brownout protection in which a voltage drop of 32% from nominal can be tolerated. Voltage regulation for the system itself is provided which varies ±0.5% of nominal voltage. Blackout protection is obtained for the system of up to five seconds with maximum ride through provided by the flywheel. The optional feature of an uninterrupted bypass is available which is synchronized at 5° maximum shift. Single phase protection is obtained up to 65% of weighted load. Total isolation is obtained for common mode noise attenuation and transverse mode noise attenuation. Overload protection is provided of 115% for two hours and 200% for one minute. Harmonic distortion is less than 3% and the power factor for the system is 0.8 or greater. The system provides extremely quiet operation of as low as 62 db as compared to other systems which may run as high as 85 db. Temperature range from 10° C. to 40° C. may be tolerated. Humidity may vary from 10% to 95% relative humidity and the altitude at which the system may be operated varies from 0 to 8,500 feet.

Referring now to the Bell Laboratory report mentioned earlier, wherein it was indicated that 87% of all reported power problems were sags or load voltage conditions, the system of the present invention eliminates sags of up to 32% below nominal line voltage. With respect to the 0.7% of problems caused by surges or high voltage conditions and the 7.4% of impulses, the system of the present invention eliminates all of these problems. With respect to the 7.4% of problems resulting from power failure, the system of the present invention utilizing the flywheel to obtain maximum ride through eliminates between 25% and 50% of all power failures. Using the equipment illustrated in FIGS. 1-3 thus results in a 96% reduction in disturbances. By combining the apparatus illustrated with 15 minutes of battery reserve results in the elimination of 98% of disturbances. Stated differently, only power failures lasting longer than 15 minutes are sill experienced. Only expensive uninterruptable power supply systems complete with batteries and diesel generation or turbine equipment are designed to protect the consumer against all power failures.

While the invention has been illustrated and described with respect to a preferred embodiment thereof, it will be recognized that the invention may be otherwise variously embodied and practiced within the scope of the claims which follow.

What is claimed is:

1. A rotary power module especially useful in computer room applications which comprises:
   a. a vertically mounted induction motor having a vertically extending output shaft,
   b. a vertically synchronous generator positioned above said induction motor with a vertically extending shaft in line with the output shaft of said induction motor,
   c. an electrically insulating coupling member directly coupling said shafts of said induction motor and said synchronous generator,
   d. a flywheel mounted on said vertically extending shaft of said generator,
   e. a plurality of spider-like leg members enveloping said flywheel and for supporting said synchronous generator above said induction motor,
   f. and a plate member mounted horizontally between said induction motor and said synchronous generator,
   i. said plate member providing a base for securing said spider-like leg members and said plate member being secured to a non-rotating part of said induction motor.

2. A rotary power module as defined in claim 1 including a microprocessor controlled bypass to continue to supply commercial power to said computer room in the event of a detected overload or abnormal condition to said induction motor and synchronous generator combination.

* * * * *